United States Patent
Phillips

(10) Patent No.: US 10,992,707 B2
(45) Date of Patent: Apr. 27, 2021

(54) TAGGING NETWORK DATA

(71) Applicant: Ridgeback Network Defense, Inc., Baltimore, MD (US)

(72) Inventor: Thomas Sheppard Phillips, Finksburg, MD (US)

(73) Assignee: RIDGEBACK NETWORK DEFENSE, INC., Baltimore, MD (US)

( * ) Notice: Subject to any disclaimer, the term of this patent is extended or adjusted under 35 U.S.C. 154(b) by 61 days.

(21) Appl. No.: 16/212,152

(22) Filed: Dec. 6, 2018

(65) Prior Publication Data
US 2019/0182292 A1 Jun. 13, 2019

Related U.S. Application Data

(60) Provisional application No. 62/595,849, filed on Dec. 7, 2017.

(51) Int. Cl.
*H04L 29/06* (2006.01)
*G06F 21/16* (2013.01)
*G06F 21/55* (2013.01)

(52) U.S. Cl.
CPC .......... *H04L 63/1491* (2013.01); *G06F 21/16* (2013.01); *G06F 21/554* (2013.01); *H04L 63/1416* (2013.01)

(58) Field of Classification Search
CPC . H04L 63/1491; H04L 63/1416; H04L 67/20; H04L 67/18; H04L 6/2804; H04L 67/306; G06F 21/16; G06F 21/554; H04W 4/02
See application file for complete search history.

(56) References Cited

U.S. PATENT DOCUMENTS

| | | | |
|---|---|---|---|
| 10,062,039 B1* | 8/2018 | Lockett | G06N 20/00 |
| 2002/0174082 A1* | 11/2002 | Miloushev | G06F 8/36 706/47 |
| 2003/0028567 A1 | 2/2003 | Carlson | |
| 2004/0179532 A1* | 9/2004 | Thubert | H04L 61/6059 370/395.5 |
| 2004/0199535 A1* | 10/2004 | Zuk | H04L 63/1425 |
| 2005/0175175 A1* | 8/2005 | Leech | H04L 9/0618 380/29 |
| 2008/0126553 A1 | 5/2008 | Boucher et al. | |
| 2008/0165953 A1* | 7/2008 | Patel | H04L 9/32 380/28 |
| 2008/0244076 A1* | 10/2008 | Shah | H04L 67/18 709/227 |
| 2008/0307488 A1* | 12/2008 | Hammond, II | H04L 63/20 726/1 |

(Continued)

OTHER PUBLICATIONS

International Search Report dated Feb. 4, 2019 in PCT/US18/64262.

(Continued)

*Primary Examiner* — Shanto Abedin
(74) *Attorney, Agent, or Firm* — Hogan Lovells US LLP

(57) ABSTRACT

Systems and methods mark or identify network data as being of interest by modifying the network data with a tag. A tag may be an unordered set of tag elements, and each tag element may be an ordered sequence of bits. For each data segment or packet transmitted, one or more fields of a network packet may be masked with a randomly chosen tag element.

10 Claims, 13 Drawing Sheets

(56) References Cited

U.S. PATENT DOCUMENTS

| | | | |
|---|---|---|---|
| 2009/0217144 A1* | 8/2009 | Turner | H04L 1/0061 |
| | | | 714/807 |
| 2010/0011434 A1* | 1/2010 | Kay | H04L 43/00 |
| | | | 726/14 |
| 2013/0117577 A1* | 5/2013 | Hars | G06F 21/85 |
| | | | 713/190 |
| 2013/0132484 A1 | 5/2013 | Berezecki | |
| 2013/0207780 A1* | 8/2013 | Poovendran | H04L 9/3273 |
| | | | 340/10.1 |
| 2013/0339548 A1 | 12/2013 | Gopinath et al. | |
| 2014/0181972 A1* | 6/2014 | Karta | H04L 63/1416 |
| | | | 726/23 |
| 2015/0012719 A1* | 1/2015 | Tune | G06F 12/0895 |
| | | | 711/171 |
| 2016/0048462 A1* | 2/2016 | O'Loughlin | G06F 21/72 |
| | | | 713/193 |
| 2016/0378868 A1* | 12/2016 | Har-Noy | G06Q 30/018 |
| | | | 707/706 |
| 2017/0094030 A1* | 3/2017 | Schumacher | H04L 67/02 |
| 2017/0324708 A1* | 11/2017 | Register | G06F 16/9014 |
| 2019/0036946 A1* | 1/2019 | Ruvio | H04W 4/44 |
| 2019/0104151 A1* | 4/2019 | Cheng | H04L 9/3213 |

OTHER PUBLICATIONS

International Search Report dated Feb. 12, 2019 in PCT/US18/64266.

* cited by examiner

800 Window Size Field (16 bits): XXXXXXXXXXXXXXXX

801 Window Size Mask (4 lsb mask): 1111111111110000

802 Window Size Mask (alternate 4 bit mask): 1111111111000011

803 Window Size Mask (alternate 5 bit mask): 1111111001010101

804 Tag Element (value = 7): 000000000000111

805 Tag Element (value = 13): 000000000001101

FIG. 8

TAGGING NETWORK DATA

CROSS REFERENCE TO RELATED APPLICATIONS

The present application claims priority to U.S. Provisional Patent Application Ser. No. 62/595,849, filed Dec. 7, 2017, which is incorporated herein by reference in its entirety.

TECHNICAL FIELD

The present invention relates generally to computer networks, and more particularly to the tagging of illicit data, or data otherwise requiring later identification, so that private or public network carriers, or law enforcement, may identify the data after the data has been routed, either intentionally or unintentionally, through an anonymizing or obfuscating process.

BACKGROUND OF THE INVENTION

Individuals or organizations accessing computer networks wishing to conceal their identity and origin can use anonymizing processes. When data has been routed through an anonymizing process it can be extremely difficult, and often practically impossible, to determine the source of the data. An individual or organization may use an anonymizing process to evade surveillance, or to conduct illicit activity without fear of being discovered.

Examples of anonymizing processes include Tor (The Onion Router), I2P (The Invisible Internet Project), and Freenet. While anonymizing processes can be beneficial when used to avoid unwarranted state surveillance or censorship, the processes can also impede law enforcement investigations. Criminals will often use anonymizing processes to evade law enforcement when unlawfully accessing computer resources. For this reason there exists a need for a method of tagging illicit network data to facilitate the tracking of unauthorized computer access.

SUMMARY

The present invention is directed to systems and methods for marking or identifying network data as being of interest by modifying the network data with a tag. A tag may be an unordered set of tag elements, and each tag element may be an ordered sequence of bits. For each data segment or packet transmitted, one or more fields of a network packet (for example, a network protocol header) may be masked with a randomly chosen tag element.

BRIEF DESCRIPTION OF THE DRAWINGS

FIG. 8 is an illustration showing examples of tagging the TCP window size.

DETAILED DESCRIPTION

When a person commits a physical crime, such as shoplifting, the person may be apprehended by law enforcement and positively identified using a biometric measure such as a fingerprint. If that same person were to commit a crime using a computer, the person could access a target computer by means of a proxy or other anonymizing process. It is exceptionally difficult to positively identify a person committing a crime via an anonymizing process, and therefore there is little risk of the person being apprehended by law enforcement, even if the crime is detected. The present invention is directed to systems and methods for tagging network data by injecting a tag or signature into a stream of data once unauthorized computer access has been detected.

Figure 1:
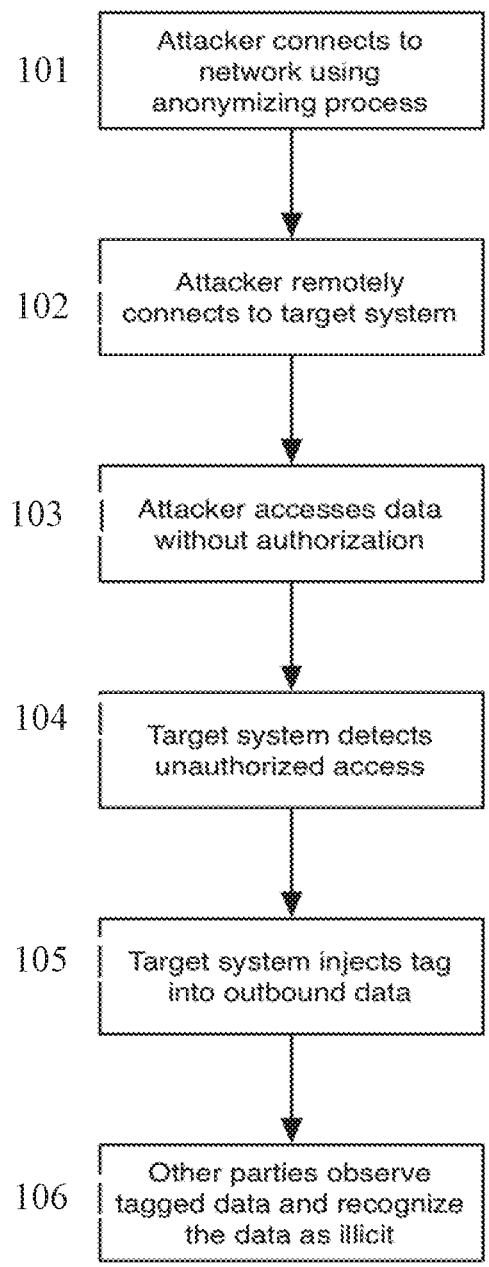
FIG. 1 is a diagram of the sequence of events leading to the tagging and identification of data.

For example, as described in FIG. 1, a criminal may connect to a network using an anonymizing process 101, for example, Tor, I2P, Freenet, or any other proxy system. The anonymizing process may provide a series of intermediate computer information systems between the criminal and a potential target system, and may operate to conceal the criminal's location or identity from the target system. The criminal may then, without authorization, remotely connect to a target system 102, for example, a server, PC, tablet, or other system connected to a wired or wireless network, via the anonymizing process 101. As a result of that unauthorized connection 102, the criminal may then unlawfully access data on the remote system 103.

In order to track the criminal for later apprehension, the target system may have software or systems installed to detect the criminal's access of the remote system. This intrusion detection may be accomplished by a variety of methods, including, for example network classification, or other intrusion detection software. Using intrusion detection, the target system or personnel affiliated with the remote system detects the unauthorized access of data 104. After detecting the unauthorized access 104, the target system may insert a tag or signature into all network traffic 105 meant to go back to the criminal, as described in more detail below. The tag or signature may be placed in one or more portions of a network packet, for example, a TCP segment, an IPv4 packets, or an IPv6 packet. The tagged network traffic may be inspected 106 by private or public network carriers, or law enforcement, at any point along the network, including at points outside the protection of the criminal's anonymizing process or proxy service, to detect the criminal's actual network location and identity. Inspection 106 of the tagged data enables private or public parties to observe the tagged data, recognize the data as illicit, and then take appropriate action. In addition to this described use, these systems and methods may be used for other purposes, for example, to enable intermediate systems to identify any user who accesses a computer information system for any purpose.

Figure 2:
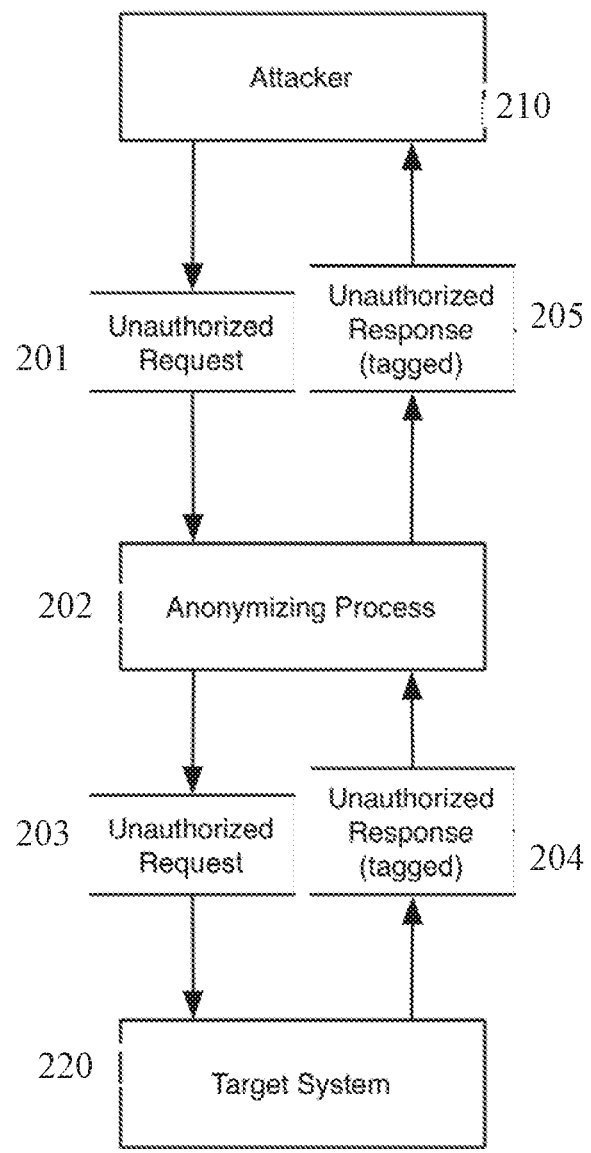
FIG. 2 is a diagram of the data flow when tagging and identifying data.

FIG. 2 provides an exemplary data flow illustrating the operation of exemplary systems and methods of data tagging and identification. An attacker 210, for example, a person, organization, or automated process that is attempting to perform unauthorized access of a target system, sends an unauthorized request 201 for access to target system 220, for example, any computer information system or device connected to a network. Request 201 passes through anonymizing process 202 which outputs modified request 203 such that the attacker's actual identity and location is masked to the target system 220 when the target system processes modified request 203. The target system 220 may, upon receiving modified request 203, detect that the attacker's access is unauthorized. In response, target system 220 may generate unauthorized response 204 which includes network data that includes a tag or signature. Unauthorized response 204 passes through anonymizing process 202, which generates non-anonymized unauthorized response 205. Non-anonymized unauthorized response 205 is then returned to the attacker 210. Law enforcement or other parties may inspect both unauthorized response 204 and non-anonymized unauthorized response 205 to detect the path the response takes back to the attacker, and may particularly analyze network traffic relating to non-anonymized unauthorized response 205 to detect the location or identity of attacker 210.

Figure 3:
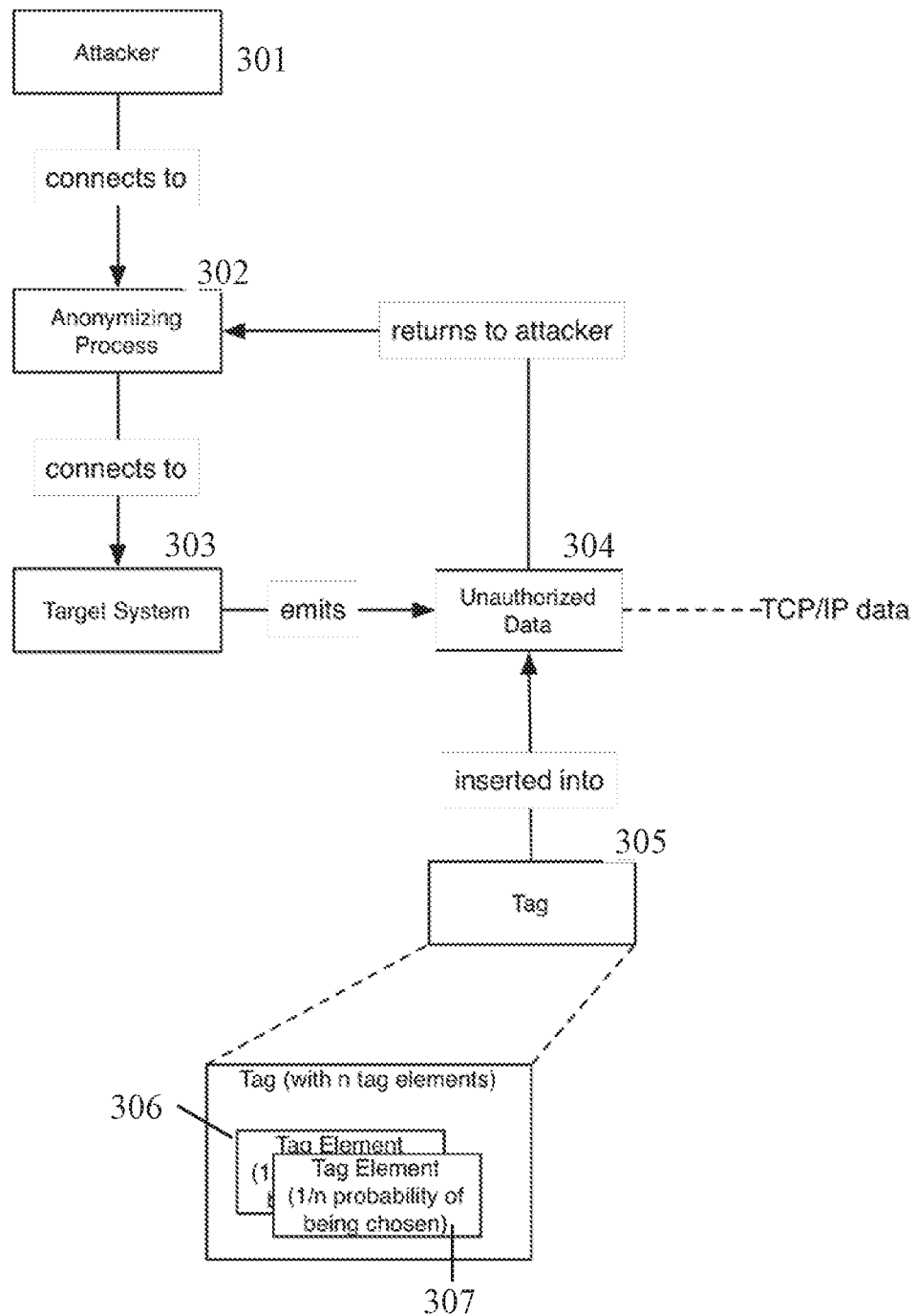
FIG. 3 is a diagram of the relationships among defined entities.

FIG. 3 provides another exemplary data flow illustrating relationships among different entities and data in the data tagging system and method. As shown in FIG. 3, an attacker 301 connects to anonymizing process 302. The anonomyzing process operates to conceal the attacker's location or identity, including both physical location and network location. The anonomyzing process used by the attacker 301 in turn connects to target system 303. The target system 303 emits data that the attacker may be unauthorized to access, for example, TCP/IP network data 304. The accessed data 304 may returned to the attacker 301 through anonymizing process 302. In accordance with the tagging system and method, a tag 305 may be inserted into data 304. The tag 305 may be inserted into the data 304 by the target system 303, or by a third party with access to the target system and authorization to interact with data going to and from the target system. The tag 305 may comprise a plurality of tag elements such as sequences of bits 306, 307, that can be used to identify particular streams of data transmitted over computer networks.

The target system may choose a particular tag 305, comprising a plurality of tag elements 306, 307, whereby each element may comprise an ordered plurality of bits for insertion into the data 304. For each portion of network data 304 tagged, for example, a TCP segment, IPv4 packet, or IPv6 packet that is transmitted from the target system to the attacker via an anonymizing process, a portion of bits may be set to a random tag element. These bits may be, for example, the least significant bits of a TCP segment's window size. When the tag elements are selected at random for insertion into data, each sequence of bits that forms a tag element may have an equal probability of being selected. Alternatively, tag elements may be selected deterministically to ensure a uniform distribution of tag elements. In one example, the selected tag is the set of tag elements {7, 6, 9, 13} and is applied to TCP segments. In this example, for every TCP segment transmitted back to the attacker, the 4 least significant bits of a field in the TCP segment, such as window size, would be set to any one of 7 (0111), 6 (0110), 9 (1001), or 13 (1101). If the elements are chosen at random, or by a suitably effective pseudorandom number generator, or by a deterministic algorithm that ensures a predictable distribution of tag elements, then the net effect is that there will be approximately the same number of tag elements appearing in the total number of TCP segments sent from the target system to the attacker via an anonymizing process. Further, the number of elements in the tag may be two or more, and the number of bits in each element may be two or more.

Figure 4:
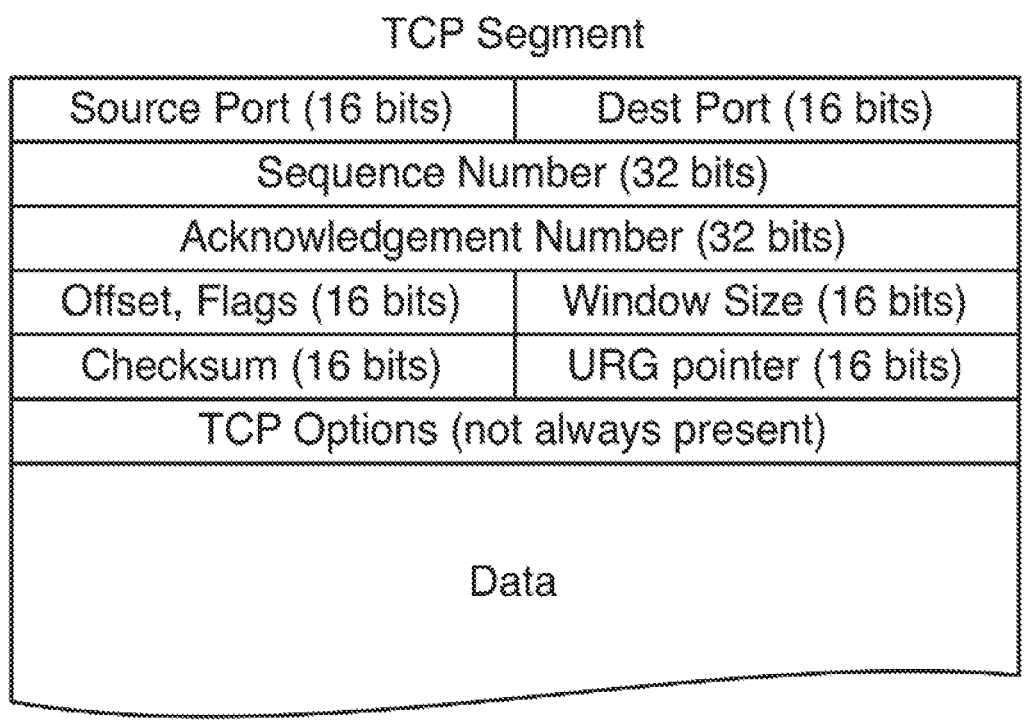
FIG. 4 is a diagram of the TCP segment.
Figure 5:
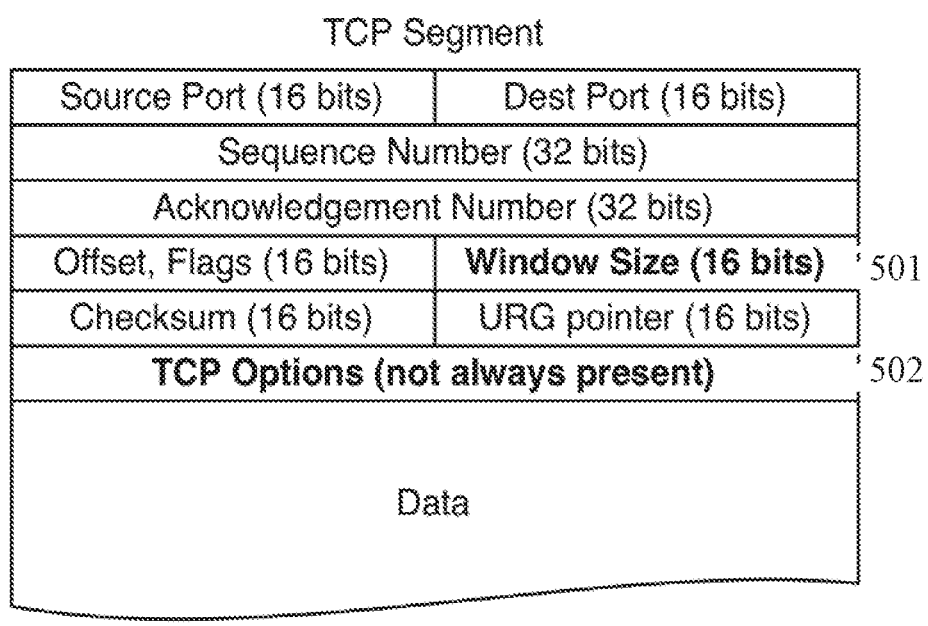
FIG. 5 is an illustration showing how fields in the TCP segment can be tagged.

FIGS. 4 and 5 both provide a graphic representation of a TCP segment, which is an example of network data which may be modified by tagging as described herein. As shown in FIG. 4, the TCP segment may have fields of varying bit lengths, including source port, destination port, sequence number, acknowledgment number, offset flags, window size, checksum, URG pointer, data, and TCP optional fields. A tag may be applied to fields within the TCP segment, for example, window size field 501 or TCP option field 502 as shown in FIG. 5. The tags may be assigned to TCP option fields already present, valid TCP option fields may be added to the TCP segments for the purpose of tagging, or invalid TCP option fields may be added to the TCP segments for the purpose of tagging.

Figure 6:
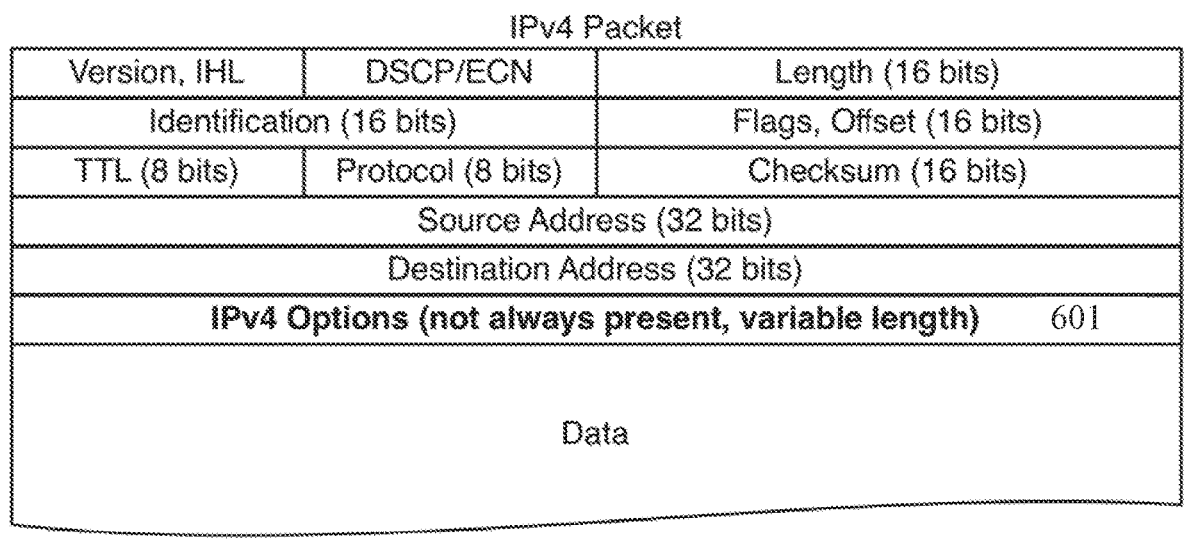
FIG. 6 is an illustration showing how fields in the IPv4 packet can be tagged.

FIG. 6 provides a graphic representation of an IPv4 packet, which is another example of network data which may be modified by tagging as described herein. As shown, IPv4 packets have fields of varying bit lengths, including version, DSCP/ECN, length, identification, flags, TTL, protocol, checksum, source address, destination address, data, and optional IPv4 fields. For example, IPv4 packets may be tagged in a manner similar to the tagging of TCP segment option fields by applying the tag to IPv4 option fields 601. The tags can be assigned to IPv4 option fields already present, valid IPv4 option fields can be added to the IPv4 packets for the purpose of tagging, or invalid IPv4 option fields can be added to the IPv4 packets for the purpose of tagging.

Figure 7:
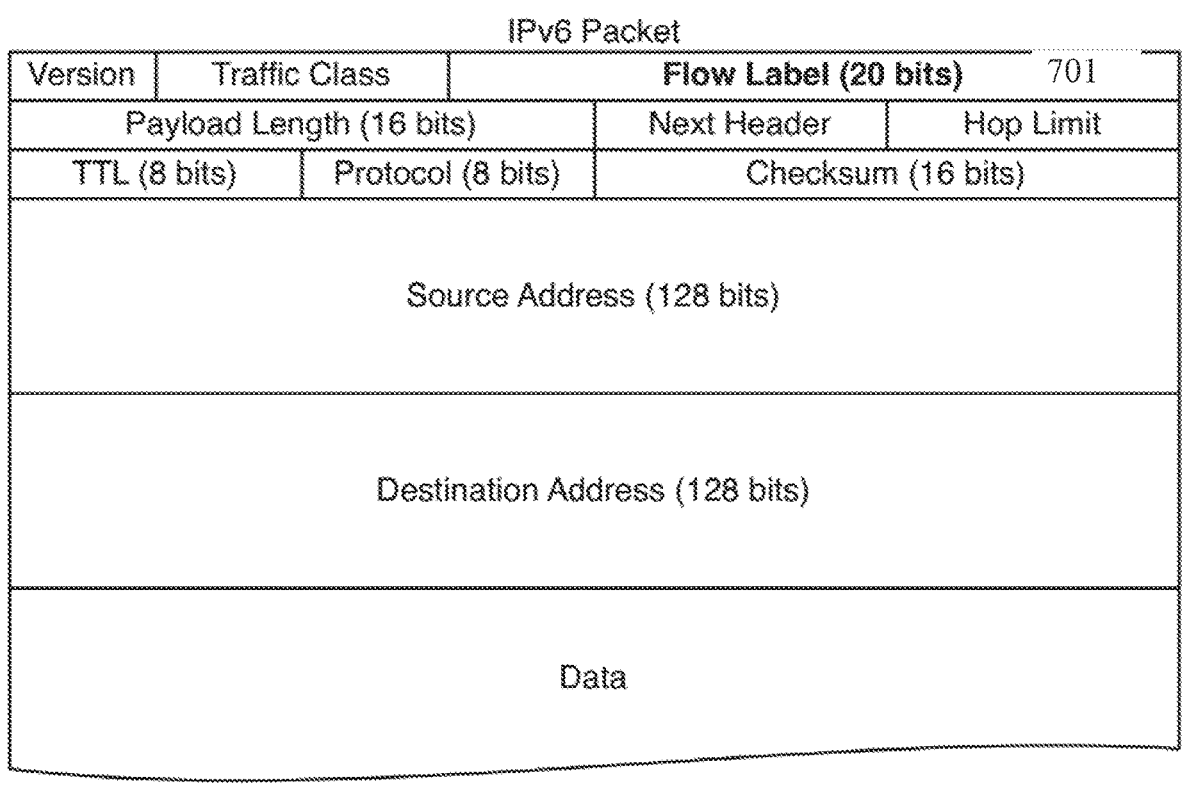
FIG. 7 is an illustration showing how fields in the IPv6 packet can be tagged.

FIG. 7 provides a graphic representation of an IPv6 packet, which is another example of network data which may be modified by tagging as described herein. As shown, IPv6 packets have fields of varying bit lengths, including version, traffic class, flow label, payload length, next header, hop limit, TTL, protocol, checksum, source address, destination address, and data fields. For example, IPv6 packets may be tagged in a manner similar to the tagging of TCP segment window size fields by applying the tag to the IPv6 flow label field 701. The tag elements may be applied to, for example, the least significant bits of the IPv6 flow label field, the tag elements may be left-shifted and then applied to the IPv6 flow label field, or each bit of a tag element can be mapped to a specific bit of the IPv6 flow control field.

In addition to the TCP, IPv4, and IPv6 fields described, other segment or protocol header for these or other network protocols can be used for the injection of tag elements, as long as the tagging process does not result in protocol abnormalities. Additionally, new fields may be added to existing protocols such that modification of the new fields may not substantively interfere with the protocol, and tag elements may be injected into these fields.

Any intermediate computer information system between the target system and attacker may then sample the tagged network data, such as the TCP window size, and determine, given knowledge of the target system's chosen tag, that the data destined for the attacker has been marked as illicit. The target system may provide tag information to intermediate computer information systems operating, for example, at law enforcement agencies or internet service providers, via any communication means, and may provide tag information before, during, or after any potential intrusion by an attacker. Intermediate computer information systems may sample the tagged network data at any time during or after the attacker's accessing the target system.

The described systems and method may also include shifting the bits of the tag elements so that the elements do not necessarily overwrite the least significant bits of a field in network data, for example TCP segment window size. For example, a bitwise "AND" operation may be performed between the field and a binary number, for example 1111111111100001, such that the 4-bit tag elements are all left-shifted, in this case by 1 binary digit. A bitwise "OR" operation may then be performed between the tag element and the field.

The described systems and method may also include assigning each bit of a tag element to a specific bit of a field in network data, for example TCP segment window size. For example, the TCP segment window size field can be tagged using one or more tag elements selected using a uniform distribution. Each tag element may consist of a plurality of bits, and the tag element bits may be mapped, in order, to the bits marked by a mask. For example, a binary "AND" operation could be performed between the field and a number, such as 1111111101010101, and the result could be input into a binary "OR" operation with a tag element, for example, a 4-bit tag element, one bit at a time, so that each bit of the tag element overlays each of the masked field bits.

Figure 9:
FIG. 9 is a diagram showing an example TCP window size tagging algorithm.
Figure 9:
Figure 9:
Figure 9:
Figure 10:
FIG. 10 is a diagram showing an example TCP window size tagging algorithm.
Figure 10:
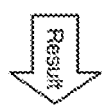
Figure 10:
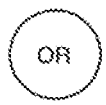
Figure 10:
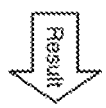

FIGS. 8, 9, and 10 provide graphical examples of how tags, as described above, may be applied to a TCP segment window size field 800, having, for example, 16 bits. Three examples 801, 802, and 803 of a 16 bit binary number are provided. Example mask 801 may be a contiguous 4 bit mask, 0000, applied to the least significant bits. Example 802 illustrates a contiguous 4 bit mask, 0000, applied to bits other than the least significant bits in the 16 bit field. Example 803 illustrates a non-contiguous 5 bit mask, where the mask bits (0 values) are applied to random, non-contiguous bits in the 16 bit field. Any of these numbers 801, 802, or 803 may modify the value stored in field 800 through use of a bitwise "AND" operation. After the bitwise "AND" is completed, a tag element, for example, tag element 804, a 16 bit binary representation of the decimal number 7, or tag element 805, a 16 bit binary representation of the decimal number 13, may be combined with the result using a bitwise "OR" operation.

FIG. 9 demonstrates an exemplary application of a tag to a TCP window size field. Mask 901 and field 900 are combined using a bitwise "AND" operation to produce result 902. Result 902 is combined with tag element 903 to produce output field 904. Output field 904 is then included in the TCP segment sent from the system to the user accessing the system. FIG. 9 illustrates, in particular, an example wherein the four least significant bits are being replaced by the tag element. As shown, the TCP window size field 900 may contain 16 bits, and have a value of 24900. This window size field 900 may be combined with mask 900, for example a contiguous 4 bit mask applied to the least significant bits, in an "AND" operation to produce result 902. As seen in the example, result 902 represents the 16 bit window size field following the operation having a value of 24896. Result 902 is then combined with tag element 903 having a value of 7, in an "OR" operation, to produce an output window size field 904 now having a value of 24903. By knowing the target system's chosen tags, any intermediate computer can sample the TCP window size in data exchanged between the target system and the attacker and determined whether data destined for the attacker has been marked as illicit.

FIG. 10 demonstrates an additional exemplary application of a tag to a TCP window size field. Mask 1001 and field 1000 are combined using a bitwise "AND" operation to produce result 1002. Result 1002 is combined with tag element 1003 to produce output field 1004. Output field 1004 is then included in the TCP segment sent from the system to the user accessing the system. As shown in FIG. 10, the tag element may be implemented in non-consecutive bits of the field, resulting in an optimized mask that may make it more difficult for an attacker to become aware of the tagged data.

Tag elements may each be two or more bits long, and there may be a plurality of tag elements. Using either more tag elements or longer tag elements (measured in number of bits), would give greater certainty that tagged data is correctly identified as illicit data.

Figure 11:
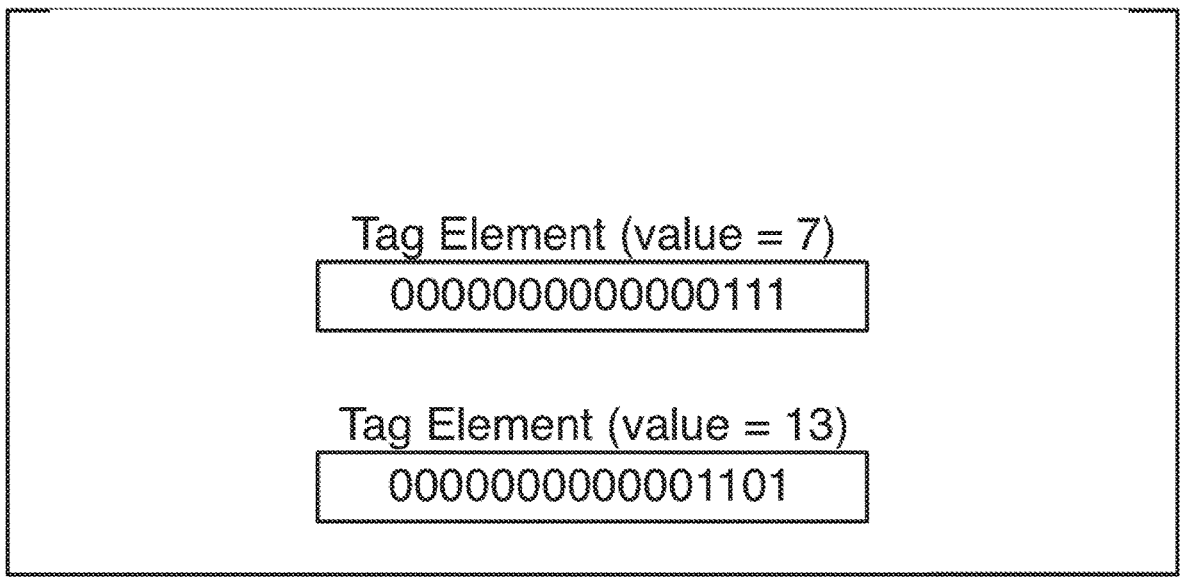
FIG. 11 is an illustration showing an example tag distribution.
Figure 12:
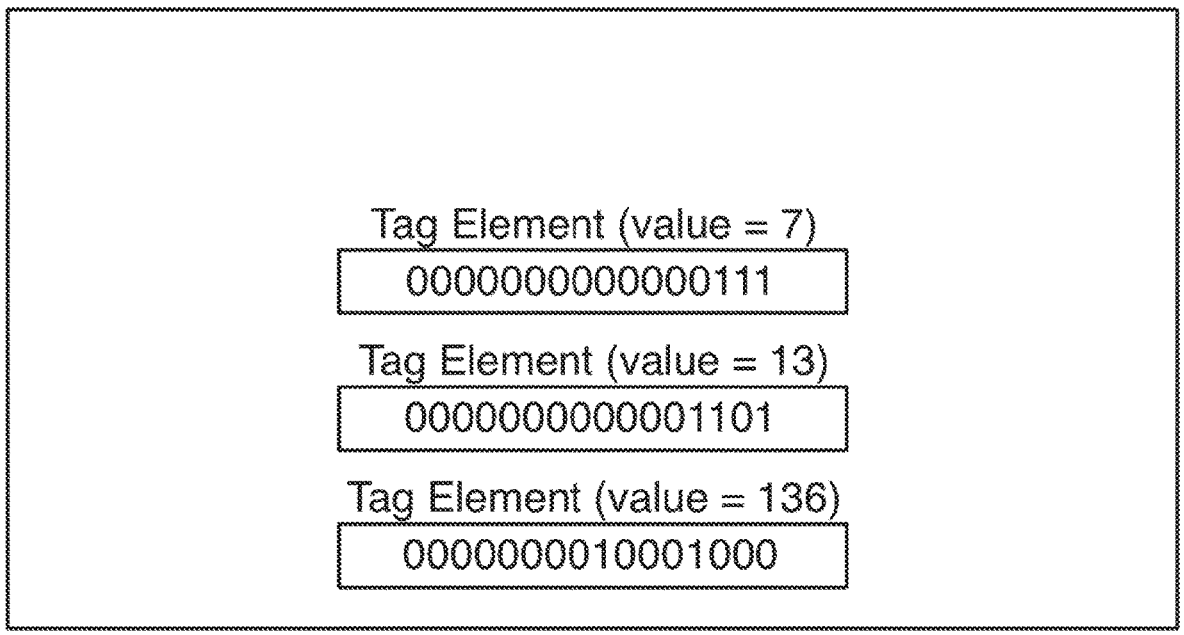
FIG. 12 is an illustration showing an example tag distribution.

The system and method may provide for a uniform or near-uniform distribution of tag elements, as shown by example in FIGS. 11 and 12, and, alternatively, may provide for a non-uniform distribution of tag elements to make discovery of the tagging more difficult for the attacker. As shown in FIG. 11, two tagging elements, such as a tag element having a value of 7 and a tag element having a value of 13, may be used and distributed uniformly so that 50% of the segments or packets sent from the target system to the attacker are tagged with the value 7 and 50% are tagged with the value 13. As shown in FIG. 12, three tag elements having values of 7, 13, and 136 may be used and distributed evenly, resulting in each tag being applied to 33.333% of the segments or packets. A non-uniform distribution of four tag elements may comprise one element being selected 10% of the time, a second element being selected 10% of the time, a third element being selected 10% of the time, and a fourth element being selected 70% of the time. Such a non-uniform distribution of tags may make it more difficult for the attacker to discover that a tagging and tracking system is being implemented on data sent from the target system.

Figure 13:
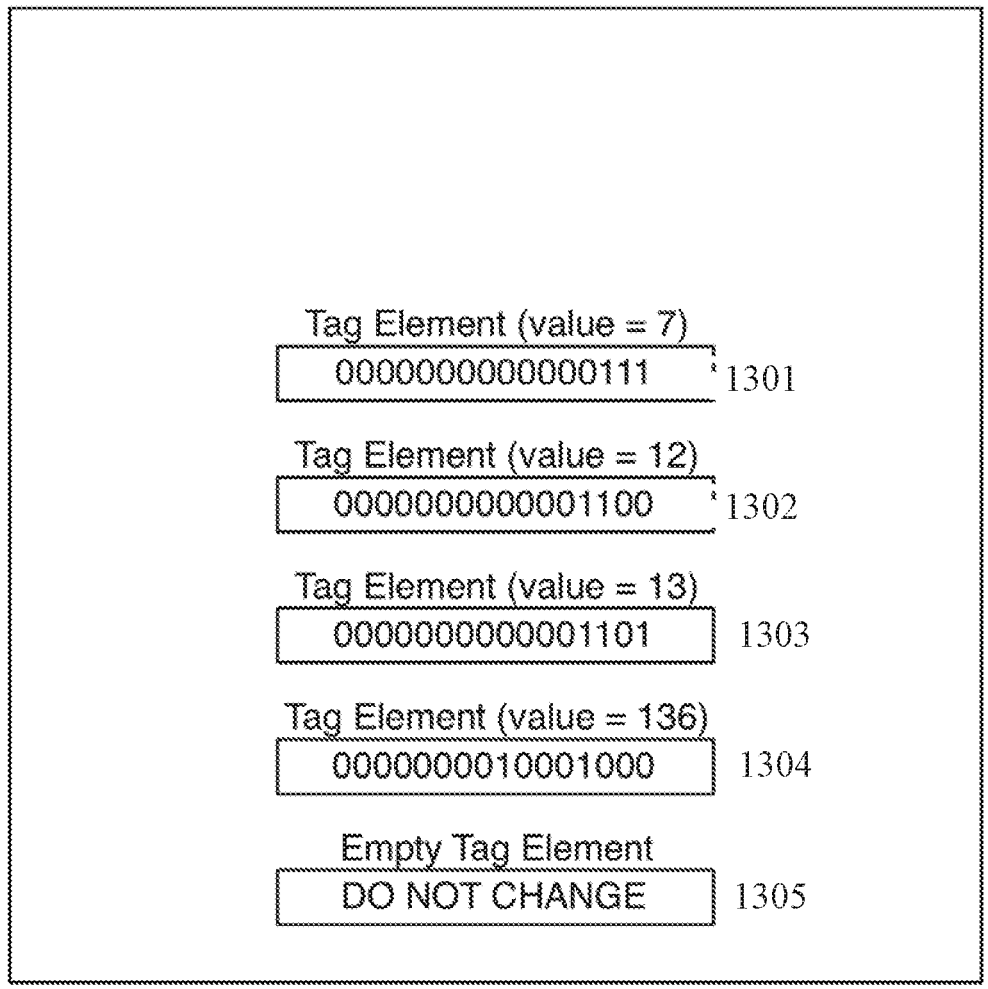
FIG. 13 is an illustration showing an example tag distribution.

The system and method may also provide for the use of empty tag elements. If an empty tag element is selected, then the segment or packet field is not modified. For example, given a tag with four tag elements, one of which is an empty tag element, and the distributions of 2%, 2%, 2%, and 94%, respectively, then 94% of the time the TCP segment or IP packet will be transmitted without modification. FIG. 13 provides an example of the use of empty tag elements, where elements 1301, 1302, 1303, and 1304 modify network data when selected, and empty tag 1305 does not modify network data when selected.

One skilled in the art will understand that selection of tag elements in a uniform, near-uniform, non-uniform, or other distribution for the purpose of tagging can be done in many ways, probabilistic or deterministic, so long as the desired distribution of tag elements is achieved, including by means of a pseudorandom number generator.

What is claimed is:
1. A method to tag network data for the purpose of identifying said data at a later time, comprising:
    a) receiving a request for data over a network;
    b) selecting a field in the request received over the network in which to apply one or more tagging elements from a plurality of tag elements;
    c) selecting one or more of a plurality of tag elements, wherein the one or more selected tag elements are selected from a non-uniform distribution of tag ele- ments that includes as least one empty tag element, and wherein each selected tag element comprises a sequence of bits;

d) mapping the one or more selected tag elements to bits in the selected field in the request marked by a mask to create a modified selected field, and e) performing a bitwise OR operation with the one or more selected tag elements and the selected field.

2. The method of claim 1, wherein the network uses a TCP protocol and the selected field is a TCP segment window size of a protocol header.

3. The method of claim 1, wherein the request for data is an unauthorized request.

4. The method of claim 1, further comprising responding to the request for data, wherein the response includes a stored result of the bitwise OR operation in a modified selected field.

5. The method of claim 4, further comprising a third party observing the response to the request and determining that the selected field was modified.

6. The method of claim 1, wherein the selected field is one of a version, DSCP/ECN, length, identification, flags, TTL, protocol, checksum, source address, destination address, data, or optional IPv4 field in an IPv4 packet.

7. The method of claim 1, wherein the selected field is one of a version, traffic class, flow label, payload length, next header, hop limit, TTL, protocol, checksum, source address, destination address, or data field in an IPv6 packet.

8. The method of claim 1, further comprising performing a bitwise AND operation with the selected field and a binary number.

9. The method of claim 1, further comprising selecting one or more tag elements are selected from a uniform or near-uniform distribution of tag elements.

10. The method of claim 1, wherein the selection of one or more tag elements results in a probability of the empty tag element being selected greater than 50 percent.

* * * * *